Patented Dec. 23, 1941

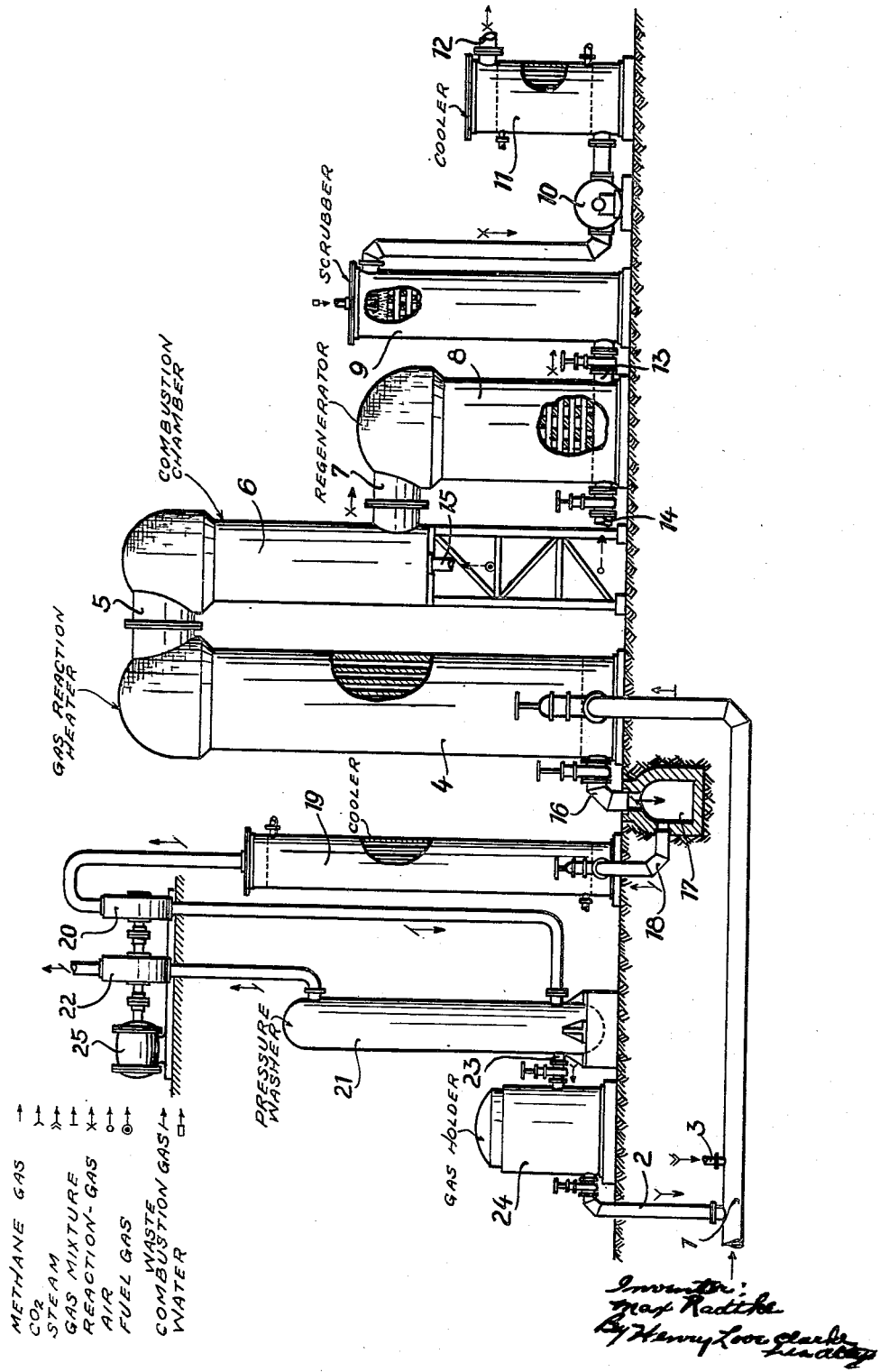

2,266,989

UNITED STATES PATENT OFFICE 2,266,989

PROCESS FOR THE MANUFACTURE OF A GAS FROM CO₂ AND METHANE, SUITABLE FOR THE SYNTHESIS OF HYDROCARBONS

Max Radtke, Essen, Germany, assignor, by mesne assignments, to Koppers Company, Pittsburgh, Pa., a corporation of Delaware Application September 30, 1938, Serial No. 232,476
In Germany October 1, 1937

1 Claim. (Cl. 48—75)

The present invention relates to the manufacture of gases suitable for the synthesis of higher hydrocarbons or the like, said gases containing definite volumes of carbon monoxide and hydrogen in a certain proportion, by reacting on methane and other decomposable compounds, or gases containing such substances, at an increased temperature with carbon dioxide or a mixture of carbon dioxide and steam, so that the methane or other hydrocarbon is decomposed into hydrogen and carbon monoxide.

More recently, processes for the manufacture of hydrocarbon mixtures have been developed in which carbon monoxide and hydrogen in the proportion of 1:1 to 1:2 are treated in the presence of certain catalysts of the iron group of the qualitative analysis, at a moderately increased temperature and at substantially normal pressure. Such synthesis in the presence of iron catalysts requires a synthesis gas which contains carbon monoxide and hydrogen in the proportion of one volume to one volume. The conversion in the presence of cobalt or nickel catalysts however requires a synthesis gas which contains carbon monoxide and hydrogen in the proportion of one volume CO to two volumes H₂.

Quite a number of natural gas sources are known for gases rather rich in methane and comparatively poor in higher hydrocarbons of which there exists up to now practically no useful employment. Of course gases rich in higher hydrocarbons and poor in methane may be utilised advantageously for the manufacture of carbon-black or other useful materials.

Now, the object of my present invention is to develop an improved method and means for producing a gas suitable for the synthesis of hydrocarbons which contains carbon monoxide and hydrogen in the proportion of 1:1 up to 1:2 from methane or methane containing gases, such as natural gas, without using carbon from other sources for instance, coal, coke, lignite or the like.

The process according to the invention consists in providing improvements for heating up the methane or methane containing gas in the presence of carbon dioxide or carbon dioxide and steam, to a high temperature for instance, 1200 degrees centigrade, within a regenerative gas heater, and for the separate removal of carbon dioxide from the waste gases produced during the heating up of the gas heater, and for also adding an adjustable quantity of the carbon dioxide to the gas heater while introducing the methane or the methane containing gas.

In order to obtain a gas in the proportion of one volume carbon monoxide to one volume hydrogen, the methane according to the present invention is converted within the gas heater by the use of carbon dioxide principally in accordance with the following equation of reaction:

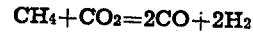

As clearly indicated, with this conversion a reaction gas in the proportion of one volume carbon monoxide to one volume of hydrogen is obtained. This gas is especially suitable for the synthesis of hydrocarbons in the presence of iron catalysts.

For the production of a gas which contains carbon monoxide and hydrogen in the proportion of 1:2 the methane is converted by using carbon dioxide and steam substantially in accordance with the following equation of reaction:

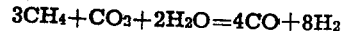

From this it follows that a reaction gas is obtained in the proportion of one volume carbon monoxide to two volumes of hydrogen, which may be used for the synthesis of hydrocarbons in the presence of cobalt or nickel catalysts.

Furthermore a synthesis gas can be made in which the proportion of carbon monoxide to hydrogen varies from one to one to one to two. The desired alteration of the gas composition is attained by reducing the steam addition required according to the second equation of reaction.

The reactions between methane and carbon dioxide or methane and a mixture consisting of carbonic acid and steam, as adopted for the process according to the present invention are already known, but heretofore these reactions have not yet been used on an industrial scale, mainly due to the fact that up to now no suitable source for the carbon dioxide necessary for the reaction was available. It may, however, also be possible to burn a part of the natural gas, or for example a part of the residual gas produced during the synthesis of hydrocarbons or the like, under a steam boiler because it is necessary, for the purpose of effecting a sufficient economy, to utilise the heat evolved during the combustion of gases. Such a combustion of natural gas requires, however, a high excess of air in order to arrive at a sufficient formation of carbon dioxide and a fairly complete combustion. On the other hand there is, however, produced in the combustion of gases rich in hydrocarbons, for instance natural gas on surfaces of a relatively low temperature as for instance in steam boilers or the like, an easily formed elementary carbon which is useless for the process.

If, however, the natural gas, or another fuel gas for instance residual gas, of the synthesis, is used for heating up the regenerative gas heaters, a complete combustion of the gas easily takes place on the large surface of the regenerator chequerwork, thus resulting in a high formation of carbon dioxide so that the recovery of carbon dioxide from waste gases of the regenerative gas heater is worth-while. The concentration of carbon dioxide of the waste gases, according to the present invention, is high enough so that by means of a well known washing with water at increased pressure, or with alkali, it is possible to recover most efficiently pure carbon dioxide from these gases, said quantity of pure carbon dioxide may be introduced in an adjustable quantity into the gas heater, or into the methane or methane containing gas flowing to the gas heater.

Still further objects and features of my present invention may be taken from the following description of a preferred embodiment thereof and from the accompanying drawing which illustrates schematically the process according to the present invention.

The gas to be treated according to the present invention, and which is freed from sulphur compounds and other impurities, if necessary, is passed through the pipe line 1 and mixed with an adjustable quantity of carbon dioxide from the pipe line 2 and, if necessary, with a steam addition from the pipe line 3, in the required amount. Preferably after passing through a heater, the gas mixture, laden with steam or not, flows into the regenerative gas heater 4 which is built similar to a hot blast stove. The gas heater 4 is equipped with a vertical shaft in which is arranged a chequerwork consisting of refractory bricks. From the upper end of the shaft, there leads a horizontal connecting channel 5 to a shaft 6 situated beside the gas heater 4 which serves as a combustion chamber and the inner space of which is not occupied. From the combustion shaft 6 leads the pipe line 7, which enters a regenerator 8 in which the gases which have been heated up in the gas heater 4 to a high temperature, for instance 1200 degrees centigrade, give off their heat. The gases then flow through the scrubber 9, thence the adjacent blower 10. After treatment in the cooler 11, a gas may then be withdrawn through the pipe line 12 which shows the desired proportion of carbon monoxide to hydrogen.

As soon as the gas heater 4 is cooled-down to such an extent that the reaction mixture is no more heated to the desired reaction temperature, the pipe lines 1, 2 and possibly 3, as well as the connecting main 13, between the regenerator 8 and the scrubber 9, are shut-off and air is admitted to the regenerator 8 through the pipe line 14. At the same time, fuel gas is introduced through the pipe line 15 at the bottom of the combustion shaft 6. Gas and air burn within the combustion shaft 6. The hot combustion gases transfer their heat within the gas heater 4 on to the refractory chequerwork and finally leave at the lower end of the gas heater 4, reaching the waste gas offtake means comprising pipe line 16 which leads to the waste gas flue thereof 17. When using combustion gases of a lower calorific value, it is advisable not only to preheat the air but also the gas, for instance the generator gas, in two regenerators 8.

An adjustable quantity of the waste combination gases is taken from the waste gas offtake means flue 17 through a partial waste gas withdrawal means comprising the pipe line 18 and delivered to a cooler 19. From there, this partial stream of waste gases flows to a compressor 20 through which the waste gases are concentrated at such a high pressure that it is possible to extract within the pressure-proof contrivance 21 a sufficient quantity of carbon dioxide from the gas by means of water. The wash water laden with carbon dioxide is released from the pressure within a contrivance which is not indicated on the drawing. If necessary, power may be generated whereby the carbon dioxide liberated by the release of pressure on the water, which carbon dioxide is subject to a purification if necessary, is delivered through a pipe line 23 into a gas holder 24 from where adjustable quantities of carbon dioxide may be taken out as required. The residual gas under high pressure after leaving the washing contrivance 21 is released of pressure in a contrivance 22 with the recovery of power, when the contrivance 22 is to serve to assist the compressor drive 25.

If the process is based, for instance, upon the use of pure methane and introducing 1 cu. m. per unit of time through the pipe line 1 then 1 cu. m. of carbon dioxide likewise has to be added from the pipe line 2. By the conversion in the gas heater 4, one obtains then 4 cu. m. of gas which is essentially in the proportion of 1 volume carbon monoxide to 1 volume of hydrogen. If, moreover, steam is added in the same process through the pipe line 3, one obtains a gas the proportion of carbon monoxide to hydrogen of which approaches 1:2, which depends upon the quantity of steam added. In order to produce a gas which substantially is in the proportion of 1 volume of carbon monoxide to 2 volumes of hydrogen, it will be necessary for instance to add 0.33 cu. m. of carbon dioxide to 1 cu. m. of pure methane through the pipe line 2 and 0.66 cu. m. of steam through the pipe line 3.

I have now above described my present invention on the lines of a preferred embodiment thereof, but my invention is not limited in all its aspects to the mode of carrying it out as described and shown, the invention may be variously embodied within the scope of the following claim.

I claim:

Apparatus for producing gases containing carbon monoxide and hydrogen in the proportion of 1 volume CO to approximately 1–2 volumes of hydrogen, comprising a gas heater having a checkerbrick section side by side with an unobstructed checkerless combustion section and connected at their tops for flow of combustion gases up through the combustion section and down through the checkerbrick section and reactant gas reversely; waste gas offtake means for offtake of waste combustion gases from the base of the checkerbrick section; inlet means for introducing gas to be reacted into the base of the checkerbrick section; partial waste gas withdrawal means for withdrawing part of the waste gas from the waste gas offtake means, a cooler; a pressure washer, and a storage chamber, connected in series with the partial waste gas withdrawal means for recovery and storage of $CO_2$ from the part of the waste combustion gas withdrawn from the waste gas offtake means; adjustable means for introducing $CO_2$ gas from the storage means into the inlet means for introducing gas to be reacted into the base of the checkerbrick section; and means for withdrawing the reacted gas from the lower part of the checkerless combustion section.

MAX RADTKE.